(Model.)
E. D. FELLOWS.
RUFFLING OR PLAITING ATTACHMENT FOR SEWING MACHINES.
No. 252,446. Patented Jan. 17, 1882.
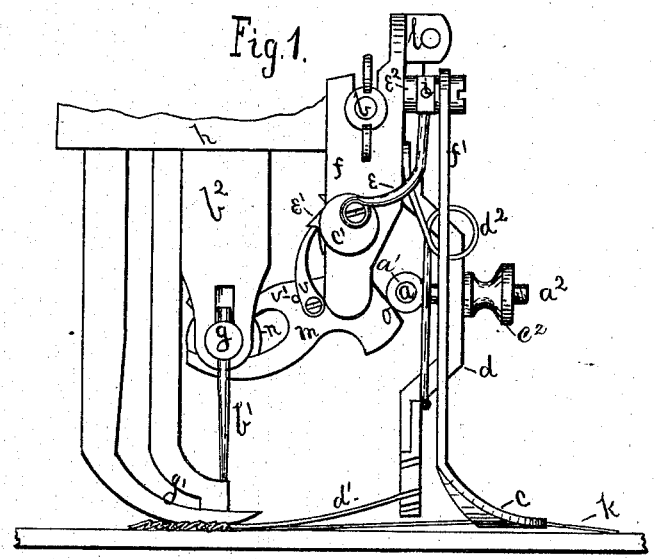
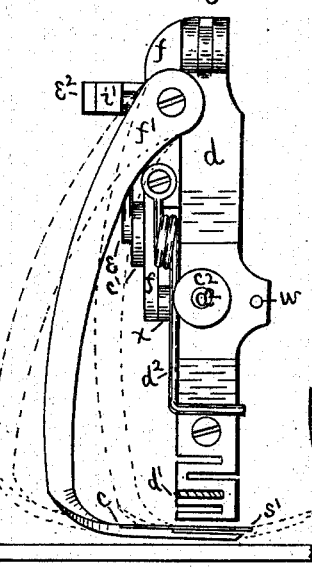
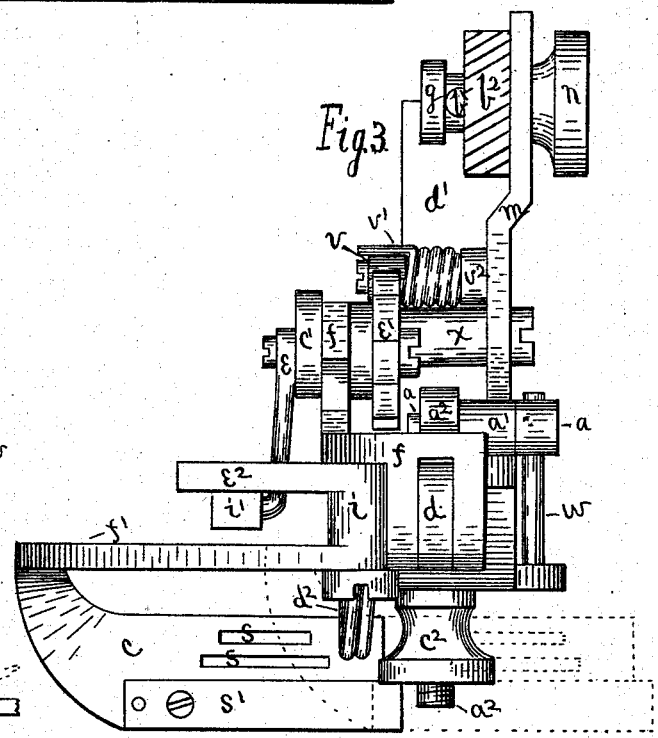
Witnesses
George F. Robinson
Wm. H. Beebe
Inventor
Edgar D. Fellows
by Bradford Howland
Attorney

UNITED STATES PATENT OFFICE.

EDGAR D. FELLOWS, OF WATERTOWN, NEW YORK, ASSIGNOR TO THE DAVIS SEWING MACHINE COMPANY.

RUFFLING OR PLAITING ATTACHMENT FOR SEWING-MACHINES.

SPECIFICATION forming part of Letters Patent No. 252,446, dated January 17, 1882.

Application filed June 27, 1881. (Model.)

*To all whom it may concern:*

Be it known that I, EDGAR D. FELLOWS, of Watertown, Jefferson county, State of New York, have invented a new and useful Improvement in Ruffling or Plaiting Attachments for Sewing-Machines, of which the following is a specification.

My invention consists of, first, a reciprocating strip-guide, in combination with a ruffler, both in one frame or attachment to a sewing-machine; second, the strip-guide having a pendulous motion across the line of sewing, in combination with the ruffler; third, the combination of the guide and ruffler with a cam-lever connected with and operated by sewing-machine mechanism; fourth, the guide, in combination with a lever which actuates it by means of a ratchet-wheel, connecting-rod, and rock-shaft, with its arms; and, fifth, in combination with the attachment-frame, the guide and ruffler, both operated by means of a cam-lever, ratchet-wheel and pawl, connecting-rod, and rock-shaft, with its arms.

In the drawings forming a part of this specification, Figure 1 is a side elevation, representing the manner of attachment to the head of a sewing-machine. Fig. 2 is a front elevation. Fig. 3 is a plan on an enlarged scale.

The frame $f$ of the attachment is fastened by a thumb-screw, $b$, to the sewing-machine head $h$. The arm $d$, carrying the ruffling blade $d'$, is pivoted to lugs $l$ at the upper end of frame $f$. It is actuated by a cam-lever, $m$, one end of which is forked to receive the neck of needle-nut $n$. Needle $b'$, needle-yoke $g$, needle-bar $b^2$, and presser $g'$ are ordinary and well-known parts of a sewing-machine. Lever $m$ is pivoted to the projection $x$ on frame $f$, and is provided with a cam, $o$, and pawl $v$. It may be connected with and operated by a presser-bar having vertical movement, instead of by the needle-bar, if preferred.

The ruffling or plaiting is done as follows: The downward motion of needle-bar $b^2$ moves lever $m$, whose cam $o$ presses against roller $a'$ on pin $a$, which is adjustably connected by screw $a^2$ to arm $d$. Arm $d$ is thus moved back by cam $o$ when the needle-bar $b^2$ is descending, and when the needle-bar is ascending the strip $k$ is plaited by ruffling-blade $d'$ and arm $d$, which are forced forward to the position shown in the drawings by spring $d^2$, attached to frame $f$. The scallops are formed in the plaiting by guide $c$, carrying the strip, $k$, to be plaited, and having a reciprocating movement across the line of sewing. The guide $c$ is carried by the long arm $f'$ of rock-shaft $i$, pivoted to the upper part of frame $f$. The short arm $e^2$ of rock-shaft $i$ is pivoted on pin $i'$, in the head of which the upper end of connecting-rod $e$ is pivoted. The lower end of rod $e$ is pivoted to wheel $c'$. Wheel $c'$ and ratchet-wheel $e'$ are turned with their shaft in frame $f$ by pawl $v$, which is held against ratchet $e'$ by spring $v'$. Pawl $v$ is pivoted on pin $v^2$, rigidly attached to lever $m$. The upward motion of needle-bar $b^2$ lifts the forked end of lever $m$ with pawl $v$, which turns ratchet-wheel $e'$ and wheel $c'$. Connecting-rod $e$, pivoted eccentrically to the latter wheel, actuates rock-shaft $i$, and thereby gives a movement or direction of motion to guide $c$ similar to that of a pendulum. By pivoting connecting-rod $e$ nearer to or farther from the outer end of arm $e^2$ the extent of the motion of guide $c$ on each side of the line of sewing may be determined. In Fig. 2 guide $c$ is shown directly in front of arm $d$ in the line of sewing, and the dotted lines represent the extent of the reciprocating movement of the guide on each side of the line of sewing. Guide $c$ is provided with one or more slits, $s$, and a spring, $s'$, attached to the top of the guide, to produce suitable tension on the strip to be plaited, which passes between spring $s'$ and the guide and through slit $s$. Slits of different lengths may be made in guide $c$ for different widths of strips to be plaited. The extent of the movement given to arm $d$ is adjusted by turning nut $c^2$ on screw $a^2$ in the arm. Roller $a'$ turns on pin $a$, one end of which is inserted in and supported by the end of screw $a^2$. The other end of pin $a$ is enlarged and perforated for pin $w$ to enter it. When screw $a^2$ is being moved by turning nut $c^2$ pin $a$ slides on pin $w$. When nut $c^2$ has been turned on screw $a^2$ to draw back roller $a'$, less movement is given to arm $d$ by cam $o$, and when nut $c^2$ has been turned in the opposite direction the fullness of the ruffle is increased.

In my invention as herein described the guide $c$ and ruffler are combined in one attachment, for the purposes of greater simplicity of construction and convenience in applying it to and removing it from the sewing-machine by which it is operated.

I claim as my invention—

1. The combination of the ruffler with a reciprocating strip-guide, both in one frame or attachment to a sewing-machine, substantially as and for the purpose described.

2. A strip-guide having a pendulous motion across the line of sewing, in combination with the ruffler of a sewing-machine, substantially as and for the purpose described.

3. The guide $c$ and arm $d$, in combination with cam-lever $m$, adapted to be connected with and operated by sewing-machine mechanism, substantially as and for the purpose described.

4. The guide $c$, rock-shaft $i$, having arms $f'$ and $e^2$, connecting-rod $e$, wheel $c'$, ratchet-wheel $e'$, and pawl $v$, in combination with lever $m$, adapted to be connected with and operated by sewing-machine mechanism, substantially as and for the purpose described.

5. In combination with an attachment-frame, $f$, the guide $c$, rock-shaft $i$, having arms $f'$ and $e^2$, rod $e$, ratchet-wheel $e'$, pawl $v$, lever $m$, and arm $d$, substantially as and for the purpose described.

EDGAR D. FELLOWS.

Witnesses:
LEVI A. JOHNSON,
JAMES C. BURT.